(12) United States Patent
Diab

(10) Patent No.: US 8,724,464 B2
(45) Date of Patent: May 13, 2014

(54) METHOD AND SYSTEM FOR NEAR CONTINUOUS DATA RATE LIMIT ADJUSTMENT VIA A PLURALITY OF LINK VARIABLES IN AN ENERGY EFFICIENT NETWORK

(75) Inventor: Wael William Diab, San Francisco, CA (US)

(73) Assignee: Broadcom Corporation, Irvine, CA (US)

( * ) Notice: Subject to any disclaimer, the term of this patent is extended or adjusted under 35 U.S.C. 154(b) by 301 days.

(21) Appl. No.: 12/243,443

(22) Filed: Oct. 1, 2008

(65) Prior Publication Data
US 2009/0154455 A1   Jun. 18, 2009

Related U.S. Application Data

(60) Provisional application No. 61/014,300, filed on Dec. 17, 2007.

(51) Int. Cl.
| | | |
|---|---|---|
| G01R 31/08 | (2006.01) | |
| G06F 11/00 | (2006.01) | |
| G08C 15/00 | (2006.01) | |
| H04J 1/16 | (2006.01) | |
| H04J 3/14 | (2006.01) | |
| H04L 1/00 | (2006.01) | |
| H04L 12/26 | (2006.01) | |
| H04L 12/56 | (2006.01) | |

(52) U.S. Cl.
CPC ................................ *H04L 47/10* (2013.01)
USPC .......... 370/235; 370/204; 370/206; 370/207; 370/229; 370/236; 370/252; 370/311; 370/321; 370/328; 370/329; 370/330; 370/331; 370/332; 370/333; 370/334; 370/335; 370/336; 370/338; 370/349; 370/351; 370/465; 370/466; 370/467; 370/468; 370/470; 370/474; 370/477; 709/232; 709/233; 709/234

(58) Field of Classification Search
None
See application file for complete search history.

(56) References Cited

U.S. PATENT DOCUMENTS 5,359,593 A * 10/1994 Derby et al. .................. 370/234
5,361,249 A * 11/1994 Monastra et al. ............. 370/217
(Continued)

FOREIGN PATENT DOCUMENTS

EP   1 473 870   11/2004
EP   1484876     12/2004
(Continued)

OTHER PUBLICATIONS

Gupta et al., "Dynamic Ethernet Link Shutdown for Energy Conservation on Ethernet Links." IEEE, Jun. 24, 2007. XP002524616.
(Continued)

*Primary Examiner* — Ayaz Sheikh
*Assistant Examiner* — Peter Chau
(74) *Attorney, Agent, or Firm* — Duane S. Kobayashi

(57) ABSTRACT

Aspects of a method and system for near continuous data rate limit adjustment via a plurality of link variables in an energy efficient network. In this regard, power consumption of a network device may be controlled by enabling and/or disabling one or more components in the network device based on an adjustment of a plurality of data rate variables that control a data rate limit at which the network device may communicate. Exemplary data rate variables may comprise a number of active channels of a network link over which the network device communicates, a symbol rate on an Ethernet link over which said network device communicates, an interframe gap time on an Ethernet link over which said network device communicates, a signal constellation utilized for representing signals on an Ethernet link over which said network device communicates.

18 Claims, 8 Drawing Sheets

(56) References Cited

U.S. PATENT DOCUMENTS

| | | | |
|---|---|---|---|
| 5,381,450 A * | 1/1995 | Lane | 375/340 |
| 6,085,248 A | 7/2000 | Sambamurthy et al. | |
| 6,088,827 A * | 7/2000 | Rao | 714/786 |
| 6,178,161 B1 * | 1/2001 | Terry | 370/276 |
| 6,266,795 B1 * | 7/2001 | Wei | 714/755 |
| 6,310,909 B1 * | 10/2001 | Jones | 375/220 |
| 6,381,268 B2 * | 4/2002 | Polley et al. | 375/222 |
| 6,442,174 B1 | 8/2002 | Lin | |
| 6,483,870 B1 | 11/2002 | Locklear, Jr. et al. | |
| 6,538,994 B1 | 3/2003 | Horspool et al. | |
| 6,587,473 B2 | 7/2003 | Terry et al. | |
| 6,615,387 B1 * | 9/2003 | Williamson et al. | 714/785 |
| 6,704,351 B1 * | 3/2004 | Ott et al. | 375/222 |
| 6,724,829 B1 | 4/2004 | Tzukerman et al. | |
| 6,731,692 B1 * | 5/2004 | Bhoja | 375/286 |
| 6,801,500 B1 * | 10/2004 | Chandran | 370/230.1 |
| 6,853,637 B1 | 2/2005 | Norrell et al. | |
| 6,856,597 B1 | 2/2005 | Scott | |
| 6,952,399 B1 | 10/2005 | Bayerl | |
| 7,003,331 B2 * | 2/2006 | Cromer et al. | 455/574 |
| 7,116,682 B1 | 10/2006 | Waclawsky | |
| 7,315,967 B2 | 1/2008 | Azenko et al. | |
| 7,602,721 B1 * | 10/2009 | Tangirala et al. | 370/235.1 |
| 2001/0033611 A1 * | 10/2001 | Grimwood et al. | 375/219 |
| 2002/0136231 A1 * | 9/2002 | Leatherbury et al. | 370/442 |
| 2002/0172274 A1 | 11/2002 | Carlson | |
| 2003/0053493 A1 | 3/2003 | Mobley | |
| 2003/0191854 A1 * | 10/2003 | Hsu et al. | 709/233 |
| 2004/0128610 A1 * | 7/2004 | Wei | 714/792 |
| 2004/0165575 A1 * | 8/2004 | Yang et al. | 370/349 |
| 2005/0157804 A1 * | 7/2005 | Jones | 375/261 |
| 2005/0166133 A1 * | 7/2005 | Eroz et al. | 714/801 |
| 2005/0237935 A1 * | 10/2005 | Chae et al. | 370/232 |
| 2006/0034295 A1 * | 2/2006 | Cherukuri et al. | 370/395.52 |
| 2006/0045197 A1 * | 3/2006 | Ungerboeck et al. | 375/261 |
| 2006/0140218 A1 | 6/2006 | Winterton | |
| 2007/0127581 A1 | 6/2007 | Connor | |
| 2007/0280239 A1 | 12/2007 | Lund | |
| 2008/0062888 A1 * | 3/2008 | Lusky et al. | 370/252 |
| 2008/0069014 A1 | 3/2008 | Powell et al. | |
| 2008/0069052 A1 * | 3/2008 | Mezer et al. | 370/332 |
| 2008/0201626 A1 * | 8/2008 | Sturm et al. | 714/763 |
| 2008/0225841 A1 | 9/2008 | Conway et al. | |
| 2008/0313508 A1 | 12/2008 | Starr | |
| 2009/0069057 A1 * | 3/2009 | Haartsen et al. | 455/574 |
| 2009/0080557 A1 * | 3/2009 | Wilhelmsson et al. | 375/267 |
| 2009/0097427 A1 | 4/2009 | Diab | |
| 2009/0097442 A1 | 4/2009 | Diab | |
| 2009/0097481 A1 | 4/2009 | Diab | |
| 2009/0097500 A1 | 4/2009 | Diab | |
| 2009/0103559 A1 * | 4/2009 | Pickering et al. | 370/463 |
| 2009/0154355 A1 | 6/2009 | Diab | |
| 2009/0154455 A1 | 6/2009 | Diab | |
| 2009/0154490 A1 | 6/2009 | Diab | |
| 2009/0154500 A1 | 6/2009 | Diab | |
| 2009/0154593 A1 | 6/2009 | Diab | |

FOREIGN PATENT DOCUMENTS

| | | |
|---|---|---|
| EP | 1 494 407 | 1/2005 |
| GB | 2337672 | 11/1999 |
| GB | 2337672 | 6/2000 |
| WO | WO 00/31923 | 6/2000 |

OTHER PUBLICATIONS

Wael Diab, "Energy Efficient Ethernet and 802.1." Nov. 2007. XP002524617.

Grow, "802.1 and Energy Efficient Ethernet", [Online] Sep. 11, 2007, pp. 1-6, http://www.ieee802.org/3/eee_study/public/sep07/grow_1_0907.pdf.

Teener, "Audio/Video Bridging for Home Networks (IEEE 802.1 AV Bridging Task Group)" [Online] Jun. 1, 2007, http://www.ieee802.org/3/eee_study/public/jul07/teener_1_0707.pdf.

Venkat, "Burst Reduction Properties of the Leaky Bucket Flow Control Scheme in ATM Networks", IEEE Transactions on Communications, vol. 42, No. 12, Dec. 1994, pp. 3085-3088.

* cited by examiner

METHOD AND SYSTEM FOR NEAR CONTINUOUS DATA RATE LIMIT ADJUSTMENT VIA A PLURALITY OF LINK VARIABLES IN AN ENERGY EFFICIENT NETWORK

CROSS-REFERENCE TO RELATED APPLICATIONS/INCORPORATION BY REFERENCE

This patent application makes reference to, claims priority to and claims benefit from U.S. Provisional Patent Application Ser. No. 61/014,300 filed on Dec. 17, 2007.

FIELD OF THE INVENTION

Certain embodiments of the invention relate to networking. More specifically, certain embodiments of the invention relate to a method and system for near continuous data rate limit adjustment via a plurality of link variables in an energy efficient network.

BACKGROUND OF THE INVENTION

With the increasing popularity of electronics such as desktop computers, laptop computers, and handheld devices such as smart phones and PDA's, communication networks, and in particular Ethernet networks, are becoming an increasingly popular means of exchanging data of various types and sizes for a variety of applications. In this regard, Ethernet networks are increasingly being utilized to carry, for example, voice, data, and multimedia. Broadband connectivity including internet, cable, phone and VOIP offered by service providers has led to increased traffic and more recently, migration to Ethernet networking. Much of the demand for Ethernet connectivity is driven by a shift to electronic lifestyles involving desktop computers, laptop computers, and various handheld devices such as smart phones and PDA's. Applications such as search engines, reservation systems and video on demand that may be offered at all hours of a day and seven days a week, have become increasingly popular. These recent developments have led to increased demand on datacenters, aggregation, high performance computing (HPC) and core networking.

As the number of devices connected to data networks increases and higher data rates are required, there is a growing need for new transmission technologies which enable higher data rates. Conventionally, however, increased data rates often results in significant increases in power consumption. In this regard, as an increasing number of portable and/or handheld devices are enabled for Ethernet communications, battery life may be a concern when communicating over Ethernet networks. Accordingly, ways of reducing power consumption when communicating over Ethernet networks may be needed.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for near continuous data rate limit adjustment via a plurality of link variables in an energy efficient network, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for near continuous data rate limit adjustment via a plurality of link variables in an energy efficient network. In this regard, power consumption of a network device may be controlled by enabling and/or disabling one or more components in the network device based on an adjustment of a plurality of data rate variables that control a limit on a data rate at which the network device may be enabled to communicate. Exemplary data rate variables may comprise a number of active channels of a network link over which the network device communicates, a symbol rate on an Ethernet link over which said network device communicates, an inter-frame gap time on an Ethernet link over which said network device communicates, a signal constellation utilized for representing signals on an Ethernet link over which said network device communicates. The signal constellation may be selected from a 128-DSQ signal constellation and a 8-DSQ signal constellation. Furthermore, low density parity check encoding and/or decoding may be disabled when said 8-DSQ signal constellation is selected.

Figure 1:
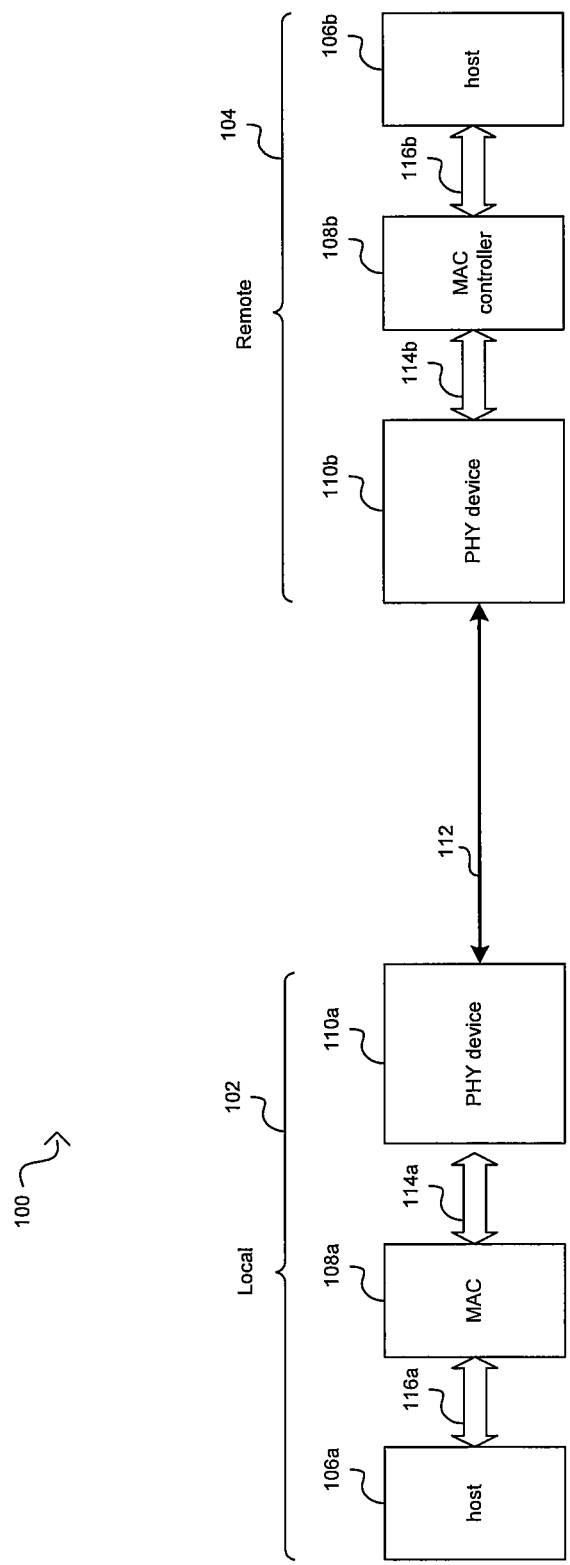
FIG. 1 is a block diagram illustrating an Ethernet connection between a two network devices, in accordance with an embodiment of the invention.

FIG. 1 is a block diagram illustrating an Ethernet connection between a two network devices, in accordance with an embodiment of the invention. Referring to FIG. 1, there is shown a system 100 that comprises a network device 102 and a network device 104.

The network devices 102 and 104 may communicate via a link 112. The Ethernet link 112 is not limited to any specific medium and may utilize any suitable medium. Exemplary Ethernet link 112 media may comprise copper, optical and/or backplane technologies. For example, a copper medium such as STP, Cat 3, Cat 5, Cat 5e, Cat 6, Cat 7 and/or Cat 7a as well as ISO nomenclature variants may be utilized. Additionally, copper media technologies such as InfiniBand, Ribbon and backplane may be utilized. With regard to optical media for the Ethernet link 112, single mode fiber as well as multi-mode fiber may be utilized.

In an exemplary embodiment of the invention, the link 112 may comprise up to four or more physical channels, each of which may, for example, comprise an unshielded twisted pair (UTP). The network device 102 and the network device 104 may communicate via two or more physical channels comprising the link 112. For example, Ethernet over twisted pair standards 10BASE-T and 100BASE-TX may utilize two pairs of UTP while Ethernet over twisted pair standards 1000BASE-T and 10GBASE-T may utilize four pairs of UTP. In this regard, however, aspects of the invention may enable varying the number of physical channels via which data is communicated.

In an exemplary embodiment of the invention, the network devices 102 and/or 104 may comprise a twisted pair PHY capable of operating at one or more standard rates such as 10 Mbps, 100 Mbps, 1 Gbps, and 10 Gbps (10BASE-T, 100GBASE-TX, 1GBASE-T, and/or 10GBASE-T); potentially standardized rates such as 40 Gbps and 100 Gbps; and/or non-standard rates such as 2.5 Gbps and 5 Gbps.

In an exemplary embodiment of the invention, the network devices 102 and/or 104 may comprise a backplane PHY capable of operating at one or more standard rates such as 10 Gbps (10GBASE-KX4 and/or 10GBASE-KR); and/or non-standard rates such as 2.5 Gbps and 5 Gbps.

In an exemplary embodiment of the invention, the network devices 102 and/or 104 may comprise an optical PHY capable of operating at one or more standard rates such as 10 Mbps, 100 Mbps, 1 Gbps, and 10 Gbps; potentially standardized rates such as 40 Gbps and 100 Gbps; and/or non-standardized rates such as 2.5 Gbps and 5 Gbps. In this regard, the optical PHY may be a passive optical network (PON) PHY.

In addition, the network devices 102 and/or 104 may support multi-lane topologies such as 40 Gbps CR4, ER4, KR4; 100 Gbps CR10, SR10 and/or 10 Gbps LX4 and CX4. Also, serial electrical and copper single channel technologies such as KX, KR, SR, LR, LRM, SX, LX, CX, BX10, LX10 may be supported. Non standard speeds and non-standard technologies, for example, single channel, two channel or four channels may also be supported. More over, TDM technologies such as PON at various speeds may be supported by the network devices 102 and/or 104.

The network device 102 may comprise a host 106a, a medium access control (MAC) controller 108a, and a PHY device 104a. The network device 104 may comprise a host 106b, a MAC controller 108b, and a PHY device 110b. Notwithstanding, the invention is not limited in this regard. In various embodiments of the invention, the network device 102 and/or 104 may comprise, for example, computer systems or audio/video (A/V) enabled equipment. In this regard, A/V equipment may, for example, comprise, a microphone, an instrument, a sound board, a sound card, a video camera, a media player, a graphics card, or other audio and/or video device. Additionally, the network devices 102 and 104 may be enabled to utilize Audio/Video Bridging and/or Audio/video bridging extensions (collectively referred to herein as audio video bridging or AVB) for the exchange of multimedia content and associated control and/or auxiliary data.

The PHY devices 110a and 110b may each comprise suitable logic, circuitry, and/or code that may enable communication, for example, transmission and reception of data, between the network device 102 and the network device 104. The PHY devices 110a and 110b may support, for example, Ethernet over copper, Ethernet over fiber, and/or backplane Ethernet operations. The PHY devices 110a and 110b may enable multi-rate communications, such as 10 Mbps, 100 Mbps, 1000 Mbps (or 1 Gbps), 2.5 Gbps, 4 Gbps, 10 Gbps, or 40 Gbps, for example. In this regard, the PHY devices 110a and 110b may support standard-based data rate limits and/or non-standard data rate limits. Moreover, the PHY devices 110a and 110b may support standard Ethernet link lengths or ranges of operation and/or extended ranges of operation. The PHY devices 110a and 110b may enable communication between the network device 102 and the network device 104 by utilizing a link discovery signaling (LDS) operation that enables detection of active operations in the other network device. In this regard the LDS operation may be configured for supporting a standard Ethernet operation and/or an extended range Ethernet operation. The PHY devices 110a and 110b may also support autonegotiation for identifying and selecting communication parameters such as speed and duplex mode.

In various embodiments of the invention, the PHY devices 110a and 110b may comprise suitable logic, circuitry, and/or code that may enable transmission and/or reception at a high (er) data in one direction and transmission and/or reception at a low(er) data rate in the other direction. For example, the network device 102 may comprise a multimedia server and the network device 104 may comprise a multimedia client. In this regard, the network device 102 may transmit multimedia data, for example, to the network device 104 at high(er) data rates while the network device 104 may transmit control or auxiliary data associated with the multimedia content at low (er) data rates.

The data transmitted and/or received by the PHY devices 110a and 110b may be formatted in accordance with the well-known OSI protocol standard. The OSI model partitions operability and functionality into seven distinct and hierarchical layers. Generally, each layer in the OSI model is structured so that it may provide a service to the immediately higher interfacing layer. For example, layer 1, or physical layer, may provide services to layer 2 and layer 2 may provide services to layer 3. The data transmitted may comprise frames of Ethernet media independent interface (MII) data which may be delimited by start of stream and end of stream delimiters, for example.

In an exemplary embodiment of the invention illustrated in FIG. 1, the hosts 106a and 106b may represent layer 3 and above, the MAC controllers 108a and 108b may represent layer 2 and above and the PHY devices 110a and 110b may represent the operability and/or functionality of layer 1 or the physical layer. In this regard, the PHY devices 110a and 110b may be referred to as Physical layer transmitters and/or receivers, physical layer transceivers, PHY transceivers, PHYceivers, or PHY, for example. The hosts 106a and 106b may comprise suitable logic, circuitry, and/or code that may enable operability and/or functionality of the five highest functional layers for data packets that are to be transmitted over the link 112. Since each layer in the OSI model provides a service to the immediately higher interfacing layer, the MAC controllers 108a and 108b may provide the necessary services to the hosts 106a and 106b to ensure that packets are suitably formatted and communicated to the PHY devices 110a and 110b. During transmission, each layer may add its own header to the data passed on from the interfacing layer above it. However, during reception, a compatible device having a similar OSI stack may strip off the headers as the message passes from the lower layers up to the higher layers.

The PHY devices 110a and 110b may be configured to handle physical layer requirements, which include, but are not limited to, packetization, data transfer and serialization/deserialization (SERDES), in instances where such an operation is required. Data packets received by the PHY devices 110a and 110b from MAC controllers 108a and 108b, respectively, may include data and header information for each of the above six functional layers. The PHY devices 110a and 110b may be configured to encode data packets that are to be transmitted over the link 112 and/or to decode data packets received from the link 112.

The MAC controller 108a may comprise suitable logic, circuitry, and/or code that may enable handling of data link layer, layer 2, operability and/or functionality in the network device 102. Similarly, the MAC controller 108b may comprise suitable logic, circuitry, and/or code that may enable handling of layer 2 operability and/or functionality in the network device 104. The MAC controllers 108a and 108b may be configured to implement Ethernet protocols, such as those based on the IEEE 802.3 standard, for example. Notwithstanding, the invention is not limited in this regard.

The MAC controller 108a may communicate with the PHY device 110a via an interface 114a and with the host 106a via a bus controller interface 116a. The MAC controller 108b may communicate with the PHY device 110b via an interface 114b and with the host 106b via a bus controller interface 116b. The interfaces 114a and 114b correspond to Ethernet interfaces that comprise protocol and/or link management control signals. The interfaces 114a and 114b may be multi-rate capable interfaces and/or media independent interfaces (MII). The bus controller interfaces 116a and 116b may correspond to PCI or PCI-X interfaces. Notwithstanding, the invention is not limited in this regard.

In operation, PHY devices such as the PHY devices 110a and 110b may conventionally transmit data via a fixed number of physical channels having a fixed data rate limit which may result in network links being underutilized and transmitting IDLE symbols for significant portions of time. In this regard, when the network devices 202 and 204 first establish a connection, they may exchange some preliminary information and/or training signals. In this regard, the network devices 102 and 104 may negotiate a data rate limit (e.g., 10 Gbps) and duplex mode (e.g., full-duplex) for communicating with each other. Additionally, in order to establish reliable communications, each of the network devices 102 and 104 may need to "train" or adjust various parameters and/or circuitry in a network device to account for variables such as the type of cabling over which data is being communicated and the environmental conditions (e.g. temperature) surrounding the cabling. Once the network devices are "trained", they may initially transmit data at 10 Gbps, for example. In this regard, conventional PHY devices may distribute traffic evenly over all available physical channels and may continuously transmit IDLE symbols between packets of actual data. However, based, for example, on link utilization, past or present traffic statistics, and/or available resources (e.g., power, buffer space, processor time, etc.), it may be determined that 10 Gbps may be higher than necessary or desired. Accordingly, controlling the data rate limit of the connection between the network devices 102 and 104 may enable the network devices 102 and 104 to communicate in a more energy efficient manner. Moreover, while the data rate limit on the link 112 may be low(er), higher layer functions and/or resources, such as portions of the MAC controller, may be placed into a low(er) power mode. The data rate limit may be controlled by, for example, controlling a number of physical channels utilized to communicate data, controlling the signal constellation utilized for representing data on the link, controlling a rate at which symbols are transmitted, and controlling the length of time between frames (the inter-frame gap). In this manner, aspects of the invention may enable network designers and/or administrators to control, with fine precision via a plurality of data rate variables, a data rate limit on an Ethernet link. At any given time instant, the data rate limit may determine the maximum data rate which the link may support at that instant. In instances that the actual data rate on the link is less than the data rate limit, the difference between the data rate limit and the actual data rate may correspond to wasted energy on the link and/or in network devices communicatively coupled to the link. Accordingly, the increased resolution with which the data rate limit may be controlled, via the plurality of variables, may enable reducing the difference between the data rate limit and the actual data rate; thus improving energy efficiency of the link and/or network devices communicatively coupled to the link.

In various embodiments of the invention, a data rate limit of a network link may be controlled to meet demands on the link, and this may result in a fixed actual data rate on the link which may effectively reduce or eliminate issues associated with links transporting bursty traffic. For example, controlling and/or determining traffic attributes (e.g., inter-frame gap times and network latencies) and/or network resources (e.g., buffer capacity and utilization) may be simplified when dealing with fixed rate traffic. Moreover, certain traffic types, such as video and audio streams, may inherently be of a fixed actual data rate and may thus lend themselves to efficient transmission over a link utilizing a fixed data rate limit.

Figure 2:
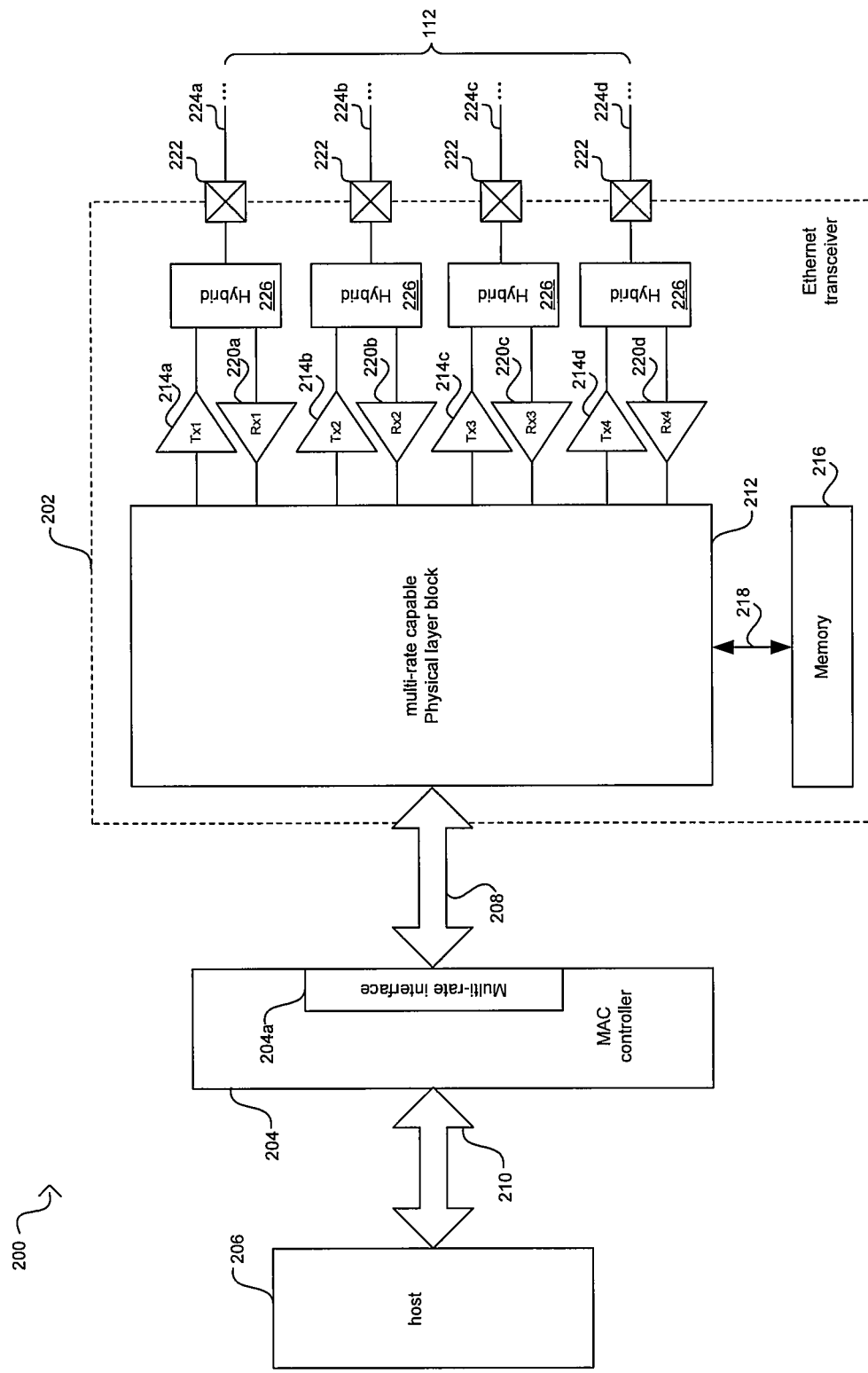
FIG. 2 is a block diagram illustrating an exemplary Ethernet over twisted pair PHY device architecture comprising a multi-rate capable physical block, in accordance with an embodiment of the invention.

FIG. 2 is a block diagram illustrating an exemplary Ethernet over twisted pair PHY device architecture comprising a multi-rate capable physical block, in accordance with an embodiment of the invention. Referring to FIG. 2, there is shown a network device 200 which may comprises an Ethernet over twisted pair PHY device 202, a MAC controller 204, a host 206, an interface 208, and a bus controller interface 210. The PHY device 202 may be an integrated device which may comprise a multi-rate capable physical layer block 212, one or more transmitters 214, one or more receivers 220, a memory 216, a memory interface 218, and one or more input/output interfaces 222.

The PHY device 202 may be an integrated device that comprises a multi-rate capable physical layer block 212, one or more transmitters 214, one or more receivers 220, a memory 216, a memory interface 218, and one or more input/output interfaces 222. The operation of the PHY device 202 may be the same as or substantially similar to that of the PHY devices 110a and 110b disclosed in FIG. 1. In this regard, the PHY device 202 may provide layer 1 (physical layer) operability and/or functionality that enables communication with a remote PHY device. Similarly, the operation of the MAC controller 204, the host 206, the interface 208, and the bus controller 210 may be the same as or substantially similar to the respective MAC controllers 108a and 108b, hosts 106a and 106b, interfaces 114a and 114b, and bus controller interfaces 116a and 116b as described in FIG. 1. The MAC controller 204 may comprise a multi-rate capable interface 204a that may comprise suitable logic, circuitry, and/or code to enable communication with the PHY device 202 at a plurality of data rates via the interface 208.

The multi-rate capable physical layer block 212 in the PHY device 202 may comprise suitable logic, circuitry, and/or code that may enable operability and/or functionality of physical layer requirements. In this regard, the multi-rate capable physical layer block 212 may enable generating the appropriate link discovery signaling utilized for establishing communication with a remote PHY device in a remote network device. The multi-rate capable physical layer block 212 may communicate with the MAC controller 204 via the interface 208. In one aspect of the invention, the interface 208 may be a media independent interface (MII) and may be configured to utilize a plurality of serial data lanes for receiving data from the multi-rate capable physical layer block 212 and/or for transmitting data to the multi-rate capable physical layer block 212. The multi-rate capable physical layer block 212 may be configured to operate in one or more of a plurality of communication modes, where each communication mode may implement a different communication protocol. These communication modes may include, but are not limited to, Ethernet over twisted pair standards 10BASE-T, 100BASE-TX, 1000BASE-T, 10GBASE-T, and other similar protocols that utilize multiple physical channels between network devices. The multi-rate capable physical layer block 212 may be configured to operate in a particular mode of operation upon initialization or during operation. For example, auto-negotiation may utilize the FLP bursts to establish a rate (e.g. 10 Mbps, 100 Mbps, 1000 Mbps, or 10 Gbps) and mode (half-duplex or full-duplex) for transmitting information.

The multi-rate capable physical layer block 212 may be coupled to memory 216 through the memory interface 218, which may be implemented as a serial interface or a bus. The memory 216 may comprise suitable logic, circuitry, and/or code that may enable storage or programming of information that includes parameters and/or code that may effectuate the operation of the multi-rate capable physical layer block 212. The parameters may comprise configuration data and the code may comprise operational code such as software and/or firmware, but the information need not be limited in this regard. Moreover, the parameters may include adaptive filter and/or block coefficients for use, for example, by the multi-rate capable physical layer block 212 and/or the hybrids 226.

Each of the transmitters 214a, 214b, 214c, 214d may comprise suitable logic, circuitry, and/or code that may enable transmission of data from the network device 200 to a remote network device via, for example, the link 112 in FIG. 1. The receivers 220a, 220b, 220c, 220d may comprise suitable logic, circuitry, and/or code that may enable receiving data from a remote network device. Each of the transmitters 214a, 214b, 214c, 214d and receivers 220a, 220b, 220c, 220d in the PHY device 202 may correspond to a physical channel that may comprise the link 112. In this manner, a transmitter/receiver pair may interface with each of the physical channels 224a, 224b, 224c, 224d. In this regard, the transmitter/receiver pairs may be enabled to provide the appropriate communication rate and mode for each physical channel.

The input/output interfaces 222 may comprise suitable logic circuitry, and/or code that may enable the PHY device 202 to impress signal information onto a physical channel, for example a twisted pair of the link 112 disclosed in FIG. 1. Consequently, the input/output interfaces 222 may, for example, provide conversion between differential and single-ended, balanced and unbalanced, signaling methods. In this regard, the conversion may depend on the signaling method utilized by the transmitter 214, the receiver 220, and the type of medium of the physical channel. Accordingly, the input/output interfaces 222 may comprise one or more baluns and/or transformers and may, for example, enable transmission over a twisted pair. Additionally, the input/output interfaces 222 may be internal or external to the PHY device 202. In this regard, if the PHY device 202 comprises an integrated circuit, then "internal" may, for example, refer to being "on-chip" and/or sharing the same substrate. Similarly, if the PHY device 202 comprises one or more discrete components, then "internal" may, for example, refer to being on the same printed circuit board or being within a common physical package.

In operation, the PHY device 202 may be enabled to transmit and receive simultaneously over up to four or more physical links. Accordingly, the network device 200 may comprise a number of hybrids 226 corresponding to the number of physical links. Each hybrid 226 may comprise suitable logic, circuitry, and/or code that may enable separating transmitted and received signals from a physical link. For example, the hybrids may comprise echo cancellers, far-end crosstalk (FEXT) cancellers, and/or near-end crosstalk (NEXT) cancellers. Each hybrid 226 in the network device 300 may be communicatively coupled to an input/output interface 222.

In operation, the network device 200 may communicate with a remote partner via the link 112. For example, for 10 Gbps Ethernet, the network device 200 may transmit data to and receive data from a remote partner via the physical channels 224a, 224b, 224c, and 224d. In this regard, when there is no data for the network device 200 to transmit, then it may transmit IDLE symbols to keep itself and/or the remote partner "trained". In this manner, power consumption of a network may be largely independent of the amount of actual data being transmitted over the network. Accordingly, controlling the data rate limit on the link 112 may enable the network devices 200 to transmit fewer IDLE symbols and thus communicate in a more energy efficient manner.

The network device 200 may disable, or put into a low(er) power state, one or more of the physical channels 224, when those one or more physical channels are not required to meet current and/or future demand of the link. In this manner, transmitters 214, receivers 220, hybrids 226, and/or portions of the multi-rate capable PHY block 212 associated with the unused physical channels may be disabled. In various embodiments of the invention, a channel in a low(er) power state a may convey little or no data any may be silent, convey IDLE symbols, and/or convey other energy. In some instances, aspects of the invention may enable placing all channels of a link into a low(er) power state.

In various embodiments of the invention, a data rate limit of a communication link may be controlled by adjusting a size of a signal constellation. In this regard, a signal constellation utilized to transmit signals on one or more active physical channels may be reduced to provide lower data rate limits. For example, a subset of a larger signal constellation may be chosen such that encoding and decoding signals may be less hardware and/or processor intensive. In this manner, portions of the multi-rate capable PHY block 212 may consume less energy when encoding data utilizing a smaller or different signal constellation. In some instances, all channels of a link may be active and a reduced signal constellation may be utilized.

The data rate limit of the communication link may also be controlled by adjusting the PAM levels utilized for signaling, by controlling the inter-frame gap (IFG) time, and/or by controlling a rate at which symbols are transmitted onto the link. For example, in instances such as 10 Gbps Ethernet, where data it typically encoded utilizing a PAM-16 scheme, aspects of the invention may enable switching to PAM-8 or PAM-4 for lower data rate limits. In this regard, utilizing fewer PAM levels, and thus smaller voltages, may reduce power consumption in the system 200 as well as energy consumed on the link 212. With regard to the IFG, the IFG may be increased so as to reduce the data rate limit while decreasing the IFG may increase the data rate limit. With regard to the symbol rate, a higher symbol rate may increase the data rate limit while a lower symbol rate may decrease the data rate limit on the link. For 10GBASE-T, for example, the standard symbol rate of 800 Msps may be reduced resulting in a lower data rate limit on the link. In this regard, one or more system and/or data clocks may be reduced in order to reduce the symbol rate.

The channels of a link may remain active and a data rate limit on each of the channels may be controlled adjusting a signal constellation, PAM levels, an IFG, and/or a symbol rate.

Figure 3:
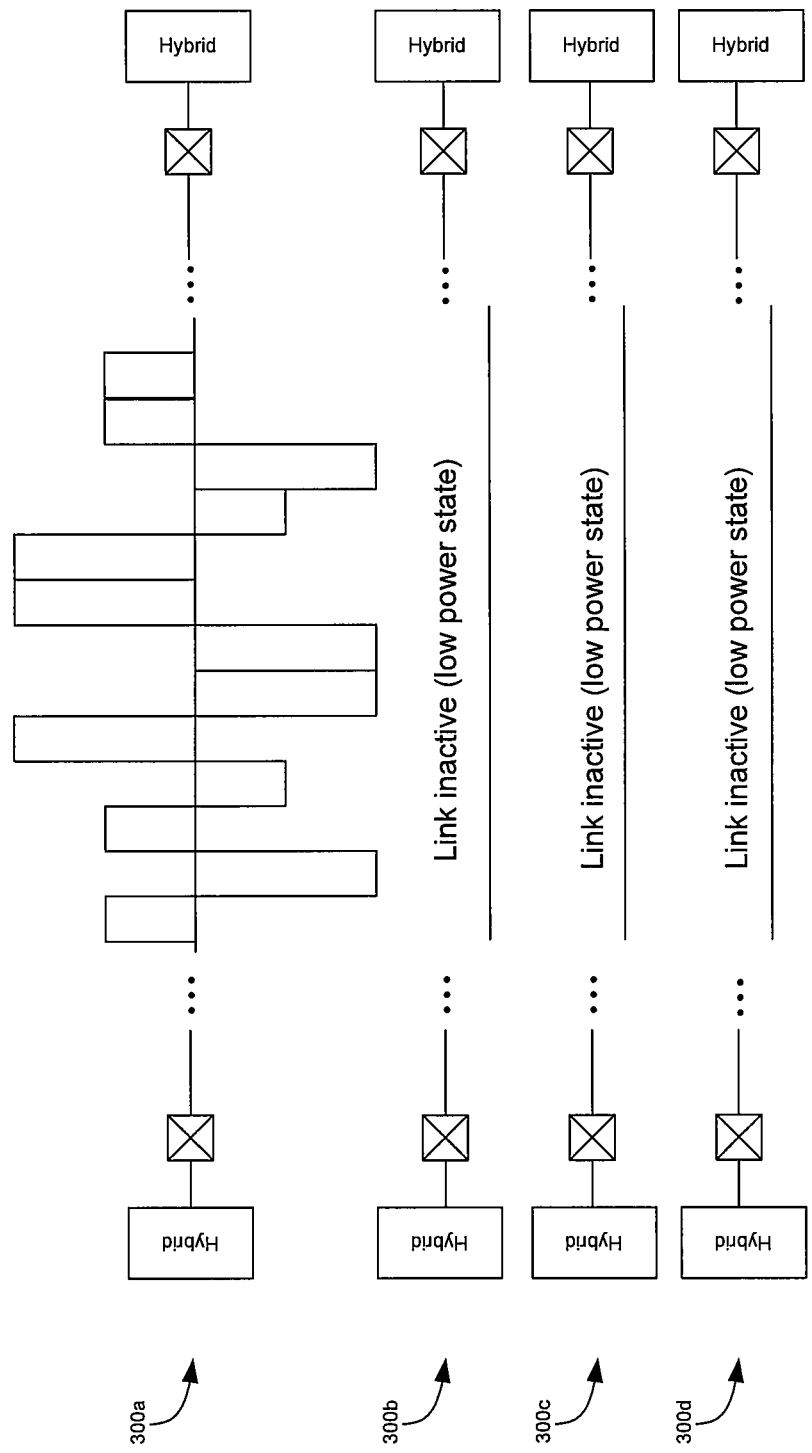
FIG. 3 is a diagram illustrating an exemplary system enabled for reduced power consumption during periods of low link utilization, in accordance with an embodiment of the invention.

FIG. 3 is a diagram illustrating an exemplary system enabled for reduced power consumption during periods of low link utilization, in accordance with an embodiment of the invention. Referring to FIG. 3 there is shown four physical channels 300a, 300b, 300c, and 300d which may exist, for example, between two network devices such as the network device 200 of FIG. 2. In this regard, power savings may be realized by reducing one or more physical channels to a low(er) power or reduced activity state. In this regard, logic, circuitry, and/or code in a network device associated with a physical channel(s) operating in a low(er) power state may be slowed down, disabled, or otherwise placed into a low(er) power state. Thus, aspects of the invention may enable reducing power consumption both on the link and in a network device. For example, in the 10 Gbps system depicted, the data rate limit may be reduced to 7.5 Gbps, 5 Gbps, or 2.5 Gbps by disabling or putting into a low(er) power state, 1, 2, or 3, respectively, of the 4 physical channels 300a, 300b, 300c, and 300d. Moreover, when operating at a lower data rate limit, aspects of the invention may enable re-starting and/or powering up one or more of the physical channels 300a, 300b, 300c, and 300d. Aspects of the invention may enable preventing the need for "re-training" and/or reducing the time for "re-training" when powering up or re-starting one or more of the physical channels 300a, 300b, 300c, and 300d.

Figure 4:
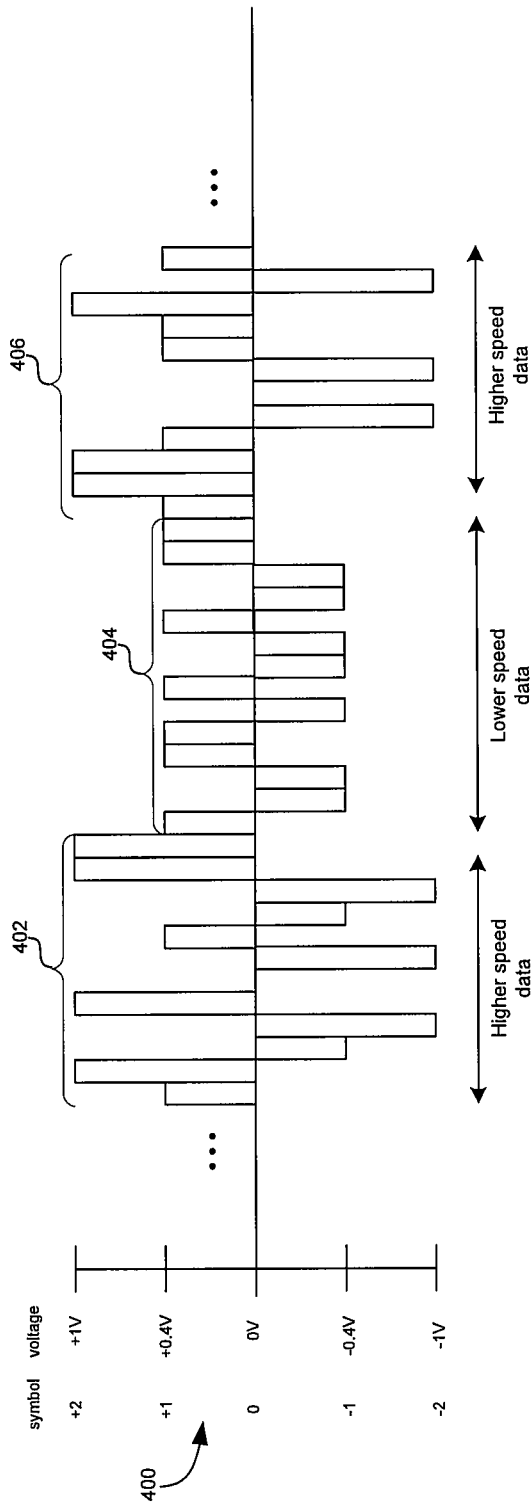
FIG. 4 is a block diagram illustrating transmission of signals utilizing a reduced number of signal levels, in accordance with an embodiment of the invention.

FIG. 4 is a block diagram illustrating transmission of signals utilizing a reduced number of signals levels, in accordance with an embodiment of the invention. Referring to FIG. 4 there is shown a data stream 400 comprising three intervals of data transmission 402, 404, and 406. The data stream 400 may be transmitted by a network device such as the network devices 102 or 104 of FIG. 1. In this regard, each of the intervals of data 402, 404, and 406 may each comprise one or more Ethernet frames.

In the exemplary 1 Gbps Ethernet system shown, PAM-5, with the levels {+2, +1, 0, −1, −2}, may be utilized for representing signals. In this regard, the levels +2, +1, 0, −1, −2 may, for example, map to voltages +1V, +0.5V, 0V, −0.5V, and −1V, respectively. Consequently, levels +2 and −2 may result in increased power consumption due to the higher voltage utilized to represent them. Accordingly, by representing signals with only the levels {+1, −1}, aspects of the invention may enable reducing the power consumed in a network link. Additionally, in instances that network devices communicate via a reduced number of signal levels, logic, circuitry, and/or code in the network devices, such as portions of the hybrids 226, transmitters 214, and/or receivers 220, may be disabled, slowed down, or otherwise placed into a low(er) power state. Thus, aspects of the invention may enable reducing power consumption both on the link and in a network device. In another embodiment of the invention, in a 10 Gbps Ethernet system, which typically uses PAM-16, the number of levels may be reduced, for example, to 4, 8, or 12 levels.

In the exemplary operation depicted in FIG. 4, during periods having a higher data rate limit, such as intervals 402 and 406, data may be represented utilizing 5 signal levels, and during periods having a lower data rate limit, such as the interval 404, 2 signal levels may be utilized. In this manner, aspects of the invention may be enabled to determine, for example, required data rate limits and adjust one or more signal constellations accordingly. For example, a network device, such as the network device 200 of FIG. 2 may be enabled to determine necessary data rate limits to prevent an overflowed buffer. Although an example of 1 Gbps Ethernet with 5 levels is provided, the original constellation size, the reduced constellation size, the original data rate limit, the reduced data rate limit, and/or other characteristics of a network and/or data transmission may differ without deviating from the scope of the invention.

Figure 5:
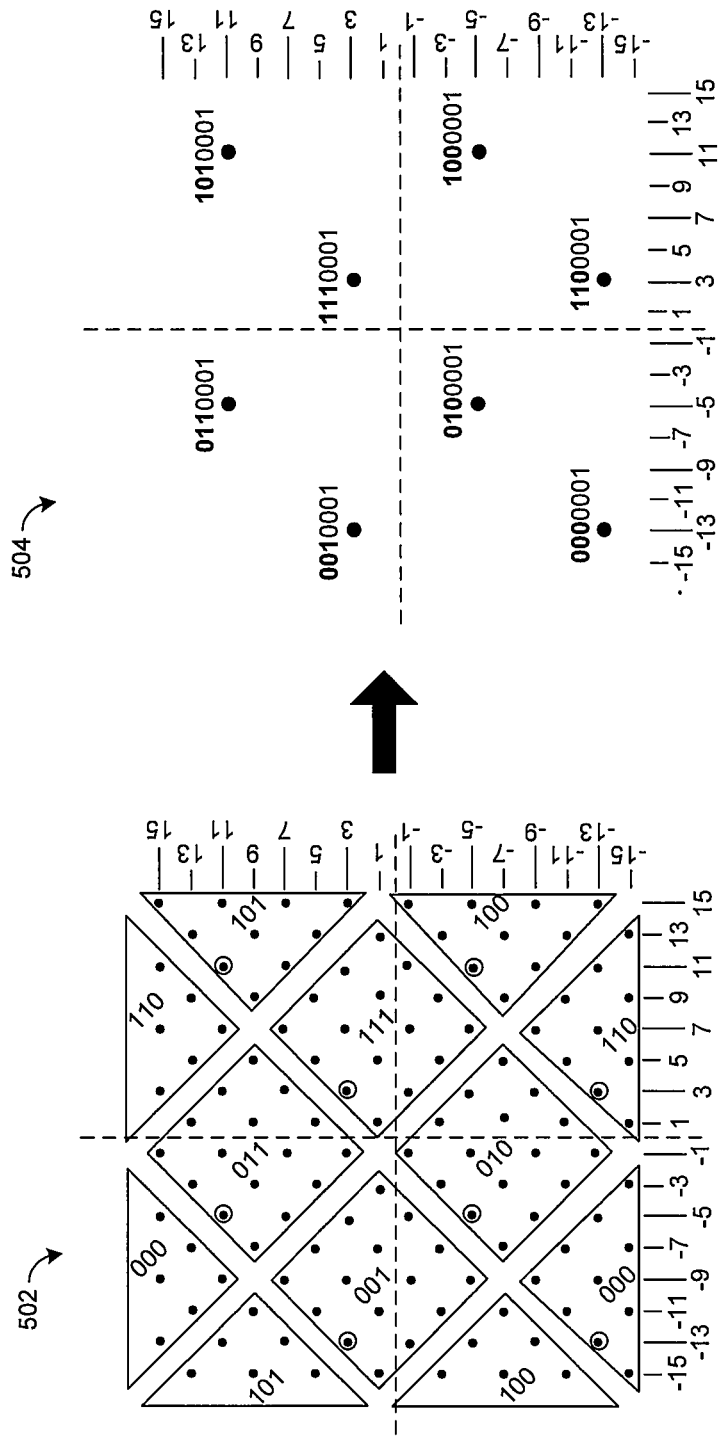
FIG. 5 is a diagram illustrating transmission of signals utilizing a reduced signal constellation, in accordance with an embodiment of the invention.

FIG. 5 is a diagram illustrating transmission of signals utilizing a reduced signal constellation, in accordance with an embodiment of the invention. In the exemplary embodiment depicted, a 128-DSQ constellation 502, as may be typically used for 10 Gbps Ethernet, may be reduced to a 8-DSQ constellation 504. In this regard, logic, circuitry, and/or code which may encode data may consume less power when encoding data utilizing the 8-DSQ constellation 504 as compared to the 128-DSQ constellation. For example, when utilizing the 8-DSQ constellation, all or a portion of a low density parity check LDPC encoder and/or decoder may be disabled, resulting in a large power savings. In various other embodiments of the invention, different signal constellations may be utilized.

Figure 6:
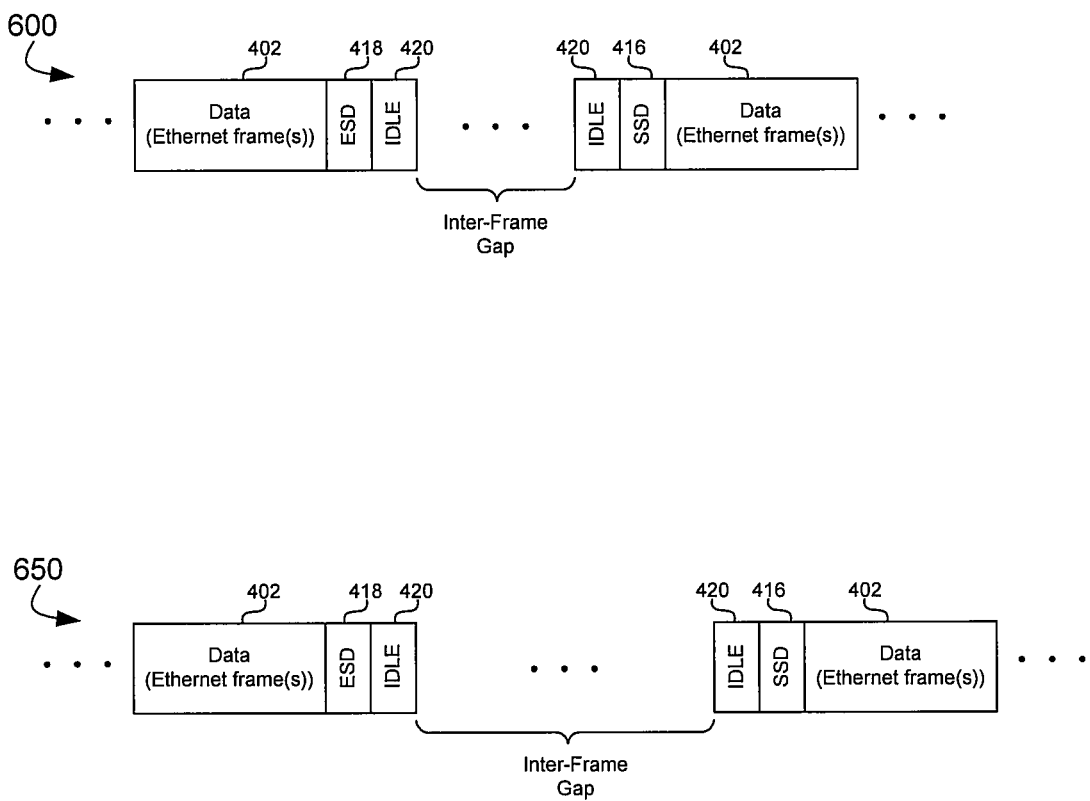
FIG. 6 is a diagram illustrating adjusting inter-frame gap to control a data rate limit on an Ethernet link, in accordance with an embodiment of the invention.

FIG. 6 is a diagram illustrating adjusting inter-frame gap to control data rate limits for an Ethernet link, in accordance with an embodiment of the invention. Referring to FIG. 6, there is shown two exemplary periods of activity in an Ethernet physical channel. In this regard, during period of activity 600, inter-frame gap may be shorter than during period 650. Accordingly, the data rate limit during period 600 may be higher than the data rate limit during period 650. In this manner, aspects of the invention may enable altering a communication rate over an Ethernet link by adjusting the inter-frame gap. For example, a subset PHY may control the number of physical channels over which data is communicated between two network devices. However, when one or more physical channels are turned off, a data rate limit on an Ethernet link may be a non-standardized rate. Accordingly, in instances when a standardized data rate limit is desired, the inter-frame gap time may be adjusted such that data is communicated at a standardized rate.

The effect of the IFG on the overall data rate limit may depend on the data being transmitted on the link. For example, if maximum sized Ethernet frames are transmitted, the IFG may represent a smaller percentage of a given time interval, whereas if minimum sized Ethernet frames are transmitted then the IFG may represents a greater percentage of the time interval. Accordingly, to achieve a desired effect on the overall data rate limit of the link, past, present, and/or predicted frame sizes and/or patterns may be taken into account when adjusting the IFG.

Figure 7:
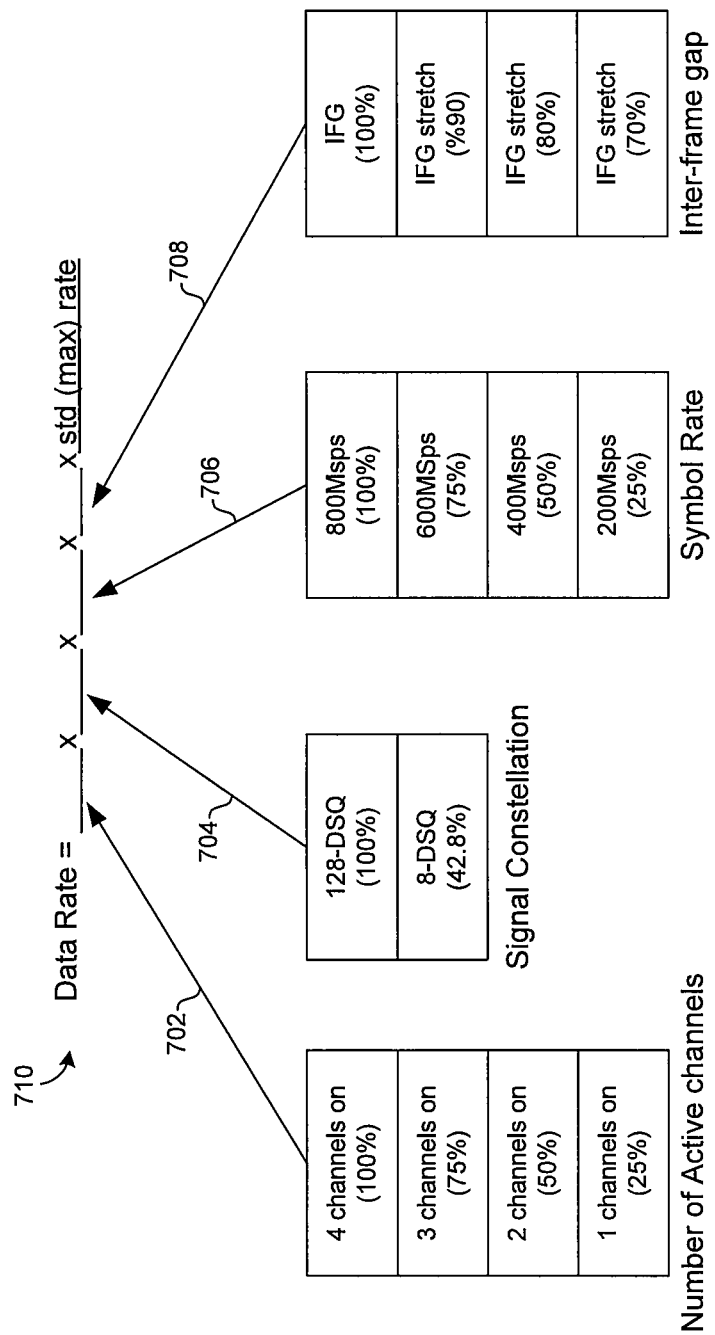
FIG. 7 is a diagram illustrating exemplary link variables utilized for adjusting a data rate limit for an Ethernet link, in accordance with an embodiment of the invention.

FIG. 7 is a diagram illustrating exemplary link variables utilized for adjusting a data rate limit of an Ethernet link, in accordance with an embodiment of the invention. Referring to FIG. 2 there is shown an exemplary equation 710 utilized for determining a data rate limit on an Ethernet link. In this regard, the exemplary embodiment may utilize a set of variables 702, 704, 706, 708. In this manner, the set of variables may be adjusted to control, with high precision, a data rate limit on an Ethernet link.

The variable 702 may comprise the number of physical channels via which data may be communicated. In this regard, for a technology comprising four physical channels, such as fast Ethernet or gigabit Ethernet, selecting from one to four physical channels may control the variable 702 to be 25%, 50%, 75%, or 100%.

The variable 704 may comprise a signal constellation utilized to represent data on the link. In this regard, in the exemplary embodiment depicted, the variable 704 may be 100% for the 128-DSQ constellation depicted in FIG. 5 or may be 42.8% for the 8-DSQ constellation depicted in FIG. 5.

The variable 706 may comprise a symbol rate utilized on the link. In the exemplary embodiment of the invention depicted, the symbol rates are for an exemplary 10GBASE-T network where the standard symbol rate is 800 Msps. In this manner, the variable 706 may be 100%, 75%, 50%, or 25% for symbol rates of 800 Msps, 600 Msps, 400 Msps, and 200 Msps, respectively. Notwithstanding, the invention is not limited to a 10GBASE-T network.

The variable 708 may comprise an inter-frame gap (IFG) time. In this regard, increasing a time between subsequent data frames may reduce the data rate limit and decreasing the inter-frame gap may enable increasing the data rate limit. In the exemplary embodiment of the invention depicted, 100%, 90%, 80%, or 70% of the standard (minimum) IFG may be selected.

In operation, one or more of the variables may be varied in order to achieve a desired data rate limit. For example, in instances that only course resolution is required, variables 704, 706, and 708 may be fixed while the number of physical channels 702 may be adjusted. In this manner, exemplary data rate scaling factors such as {1, 0.75, 0.5, 0.25} may be achieved. However, in instances that finer resolution is required, two, three, or four of the variables 702, 704, 706, and 708 may be adjusted to achieve a desired data rate limit. For example, by adjusting the number of physical channels 702 and the signal constellation 704, exemplary data rate scaling factors such as {1, 0.75, 0.5, 0.321, 0.25, 0.214, 0.107} may be achieved.

In various other embodiments of the invention, additional and/or different variables may be utilized to control the data rate limit of a link, without deviating from the scope of the invention. Additionally, the resolution, or number of possible values for each variable, may be different, without deviating from the scope of the invention.

Figure 8A:
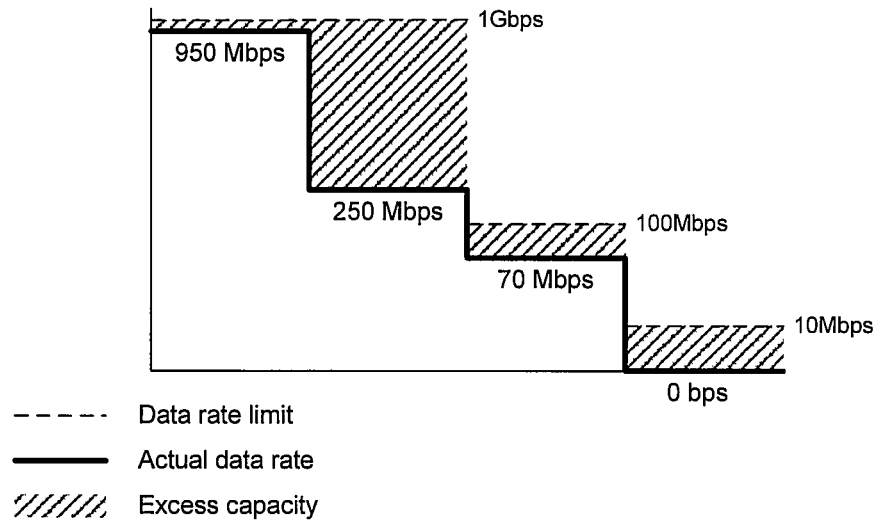
FIGS. 8A and 8B illustrate utilizing a plurality of data rate variables to achieve a data rate limit close to the actual data rate on the link, in accordance with an embodiment of the invention.
Figure 8B:
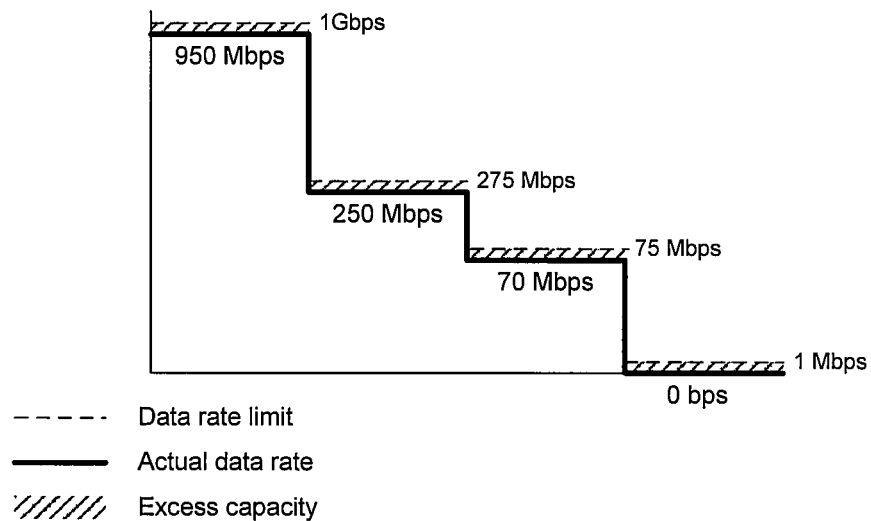

FIGS. 8A and 8B illustrate utilizing a plurality of data rate variables to achieve a data rate limit close to the actual data rate on the link, in accordance with an embodiment of the invention. FIG. 8A illustrates actual data rates and corresponding data rate limits for a conventional system. In contrast, FIG. 8B illustrates actual data rates and corresponding data rate limits for a system utilizing aspects of the present invention.

The conventional system in FIG. 8A may be restricted to data rate limits of 1000 Mbps, 100 Mbps, and 10 Mbps. Accordingly, when the actual data rate is even slightly greater than 10 Mbps, then the data rate limit of 100 Mbps must be utilized to prevent lost data or corrupted data. Similarly, when the actual data rate is even slightly greater than 100 Mbps, then the data rate limit of 1000 Mbps must be utilized to prevent lost data or corrupted data. Consequently, because data rate limit may map to energy consumption, the system in FIG. 8A may waste significant amounts of power due to the large difference in data rate limit and actual data rate. On the other hand, the system in FIG. 8B may be enabled to control data rate variable to achieve a greater number and/or increased resolution of data rate limits. Thus, the data rate limits in FIG. 8B may be made much closer to the actual data rate and may consume less power than the system in FIG. 8A.

Exemplary aspects of a method and system for near continuous data rate limit adjustment via a plurality of link variables in an energy efficient network are provided. In this regard, power consumption of a network device 200 may be controlled by enabling and/or disabling one or more components in the network device 200 based on an adjustment of a plurality of data rate variables that control a data rate limit at which the network device 200 may be enabled to communicate. Exemplary data rate variables may comprise a number of active channels 224 of a network link 112 over which the network device 200 communicates, a symbol rate on an Ethernet link 112 over which said network device 200 communicates, an inter-frame gap time on an Ethernet link 112 over which said network device 200 communicates, a signal constellation utilized for representing signals on an Ethernet link 112 over which said network device 200 communicates. The signal constellation may be selected from a 128-DSQ signal constellation 502 and a 8-DSQ signal constellation 504. Furthermore, low density parity check encoding and/or decoding may be disabled when said 8-DSQ signal constellation 504 is selected.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for near continuous data rate limit adjustment via a plurality of link variables in an energy efficient network.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for networking, comprising:
   determining, by a network device that is coupled to a network link, a data rate for traffic that is transmitted over said network link by said network device; and
   adjusting, by said network device during active operation of said network link, a transmission data rate used by said network device on said network link based on said determined data rate, said adjusting being based on a selection of a unique set of values for a plurality of transmission mode variables, wherein a first of said plurality of transmission mode variables is a signal constellation variable having a first defined range of constellation sizes that corresponds to a first range of variation of a transmission rate by said network device based on an adjustment of said first transmission mode variable, said first defined range of constellation sizes including a first signal constellation and a second signal constellation that is used with a disabled error correction function, said second signal constellation being smaller than said first signal constellation, and wherein a second of said plurality of transmission mode variables has a second defined range of values that corresponds to a second range of variation of a transmission rate by said network device based on an adjustment of said second transmission mode variable, wherein said adjusting of said transmission data rate reduces a power consumption of said network device.

2. The method according to claim 1, wherein one of said plurality of transmission mode variables is a number of active channels over which said network device communicates.

3. The method according to claim 1, wherein one of said plurality of transmission mode variables is a symbol rate used by said network device.

4. The method according to claim 1, wherein one of said plurality of transmission mode variables is an inter-frame gap time used by said network device.

5. The method according to claim 1, wherein said first signal constellation is a 128-DSQ (double square quadrature amplitude modulation) signal constellation and said second signal constellation is an 8-DSQ signal constellation.

6. The method according to claim 5, further comprising disabling a low density parity check encoding when said 8-DSQ signal constellation is selected.

7. A network device, the network device comprising:
   one or more circuits configured to:
   determine a data rate for traffic that is transmitted over a network link by said network device; and
   adjust, during active operation of said network link, a transmission data rate used by said network device on said network link based on said determined data rate, said adjusting being based on a selection of a unique set of values for a plurality of transmission mode variables, wherein a first of said plurality of transmission mode variables is a signal constellation variable having a first defined range of constellation sizes that corresponds to a first range of variation of a transmission rate by said network device based on an adjustment of said first transmission mode variable, said first defined range of constellation sizes including a first signal constellation and a second signal constellation that is used with a disabled error correction function, said second signal constellation being smaller than said first signal constellation, and wherein a second of said plurality of transmission mode variables has a second defined range of values that corresponds to a second range of variation of a transmission rate by said network device based on an adjustment of said second transmission mode variable, wherein said adjusting of said transmission data rate reduces a power consumption of said network device.

8. The network device according to claim 7, wherein one of said plurality of transmission mode variables is a number of active channels over which said network device communicates.

9. The network device according to claim 7, wherein one of said plurality of transmission mode variables is a symbol rate used by said network device.

10. The network device according to claim 7, wherein one of said plurality of transmission mode variables is an inter-frame gap time used by said network device.

11. The network device according to claim 7, wherein said first signal constellation is a 128-DSQ (double square quadrature amplitude modulation) signal constellation and said second signal constellation is an 8-DSQ signal constellation.

12. The network device according to claim 11, wherein said one or more circuits are further operable to disable a low density parity check encoding when said 8-DSQ signal constellation is selected.

13. A non-transitory machine-readable storage having stored thereon, a computer program having at least one code section for networking, the at least one code section being executable by a network device for causing the network device to perform steps comprising:
   determining a data rate for traffic that is transmitted over a network link by said network device; and
   adjusting, during active operation of said network link, a transmission data rate used by said network device on said network link based on said determined data rate, said adjusting being based on a selection of a unique set of values for a plurality of transmission mode variables, wherein a first of said plurality of transmission mode variables is a signal constellation variable having a first defined range of constellation sizes that corresponds to a first range of variation of a transmission rate by said network device based on an adjustment of said first transmission mode variable, said first defined range of constellation sizes including a first signal constellation and a second signal constellation that is used with a disabled error correction function, said second signal constellation being smaller than said first signal constellation, and wherein a second of said plurality of transmission mode variables has a second defined range of values that corresponds to a second range of variation of a transmission rate by said network device based on an adjustment of said second transmission mode variable, wherein said adjusting of said transmission data rate reduces a power consumption of said network device.

14. The non-transitory machine-readable storage according to claim 13, wherein one of said plurality of transmission mode variables is a number of active channels over which said network device communicates.

15. The non-transitory machine-readable storage according to claim 13, wherein one of said plurality of transmission mode variables is a symbol rate used by said network device.

16. The non-transitory machine-readable storage according to claim 13, wherein one of said plurality of transmission mode variables is an inter-frame gap time used by said network device.

17. The non-transitory machine-readable storage according to claim 13, wherein said first signal constellation is a 128-DSQ (double square quadrature amplitude modulation) signal constellation and said second signal constellation is an 8-DSQ signal constellation.

18. The non-transitory machine-readable storage according to claim 17, wherein the at least one code section being executable by said machine further causes the machine to disable a low density parity check encoding when said 8-DSQ signal constellation is selected.

* * * * *